United States Patent Office 3,006,601
Patented Oct. 31, 1961

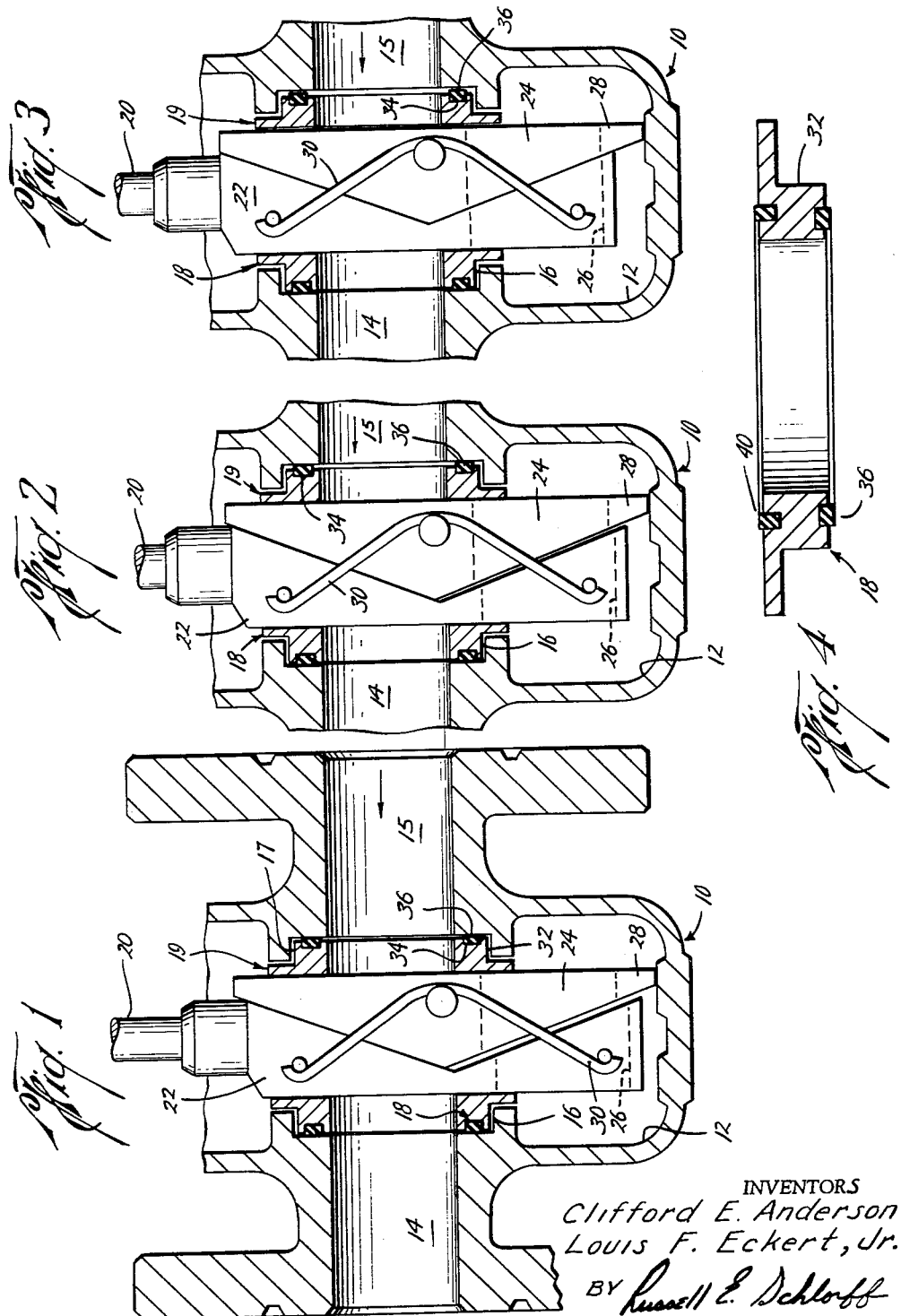

3,006,601
SEAT FOR GATE VALVE
Clifford E. Anderson and Louis F. Eckert, Jr., Houston, Tex., assignors to ACF Industries, Incorporated, New York, N.Y., a corporation of New Jersey
Filed Mar. 28, 1958, Ser. No. 724,638
1 Claim. (Cl. 251—196)

This invention relates generally to gate valves and more particularly to seat members therefor.

A parallel expanding through conduit gate valve of the type to which this invention particularly applies is fully described in M. P. Laurent's Reissue Patent 20,101, dated September 8, 1956. In such valves there is a housing having a bore therethrough which is intersected by a valve chamber in which the gate mechanism is slidably mounted. Surrounding the bore on opposite sides of the valve chamber there are annular recesses opening into the valve chamber. The seat members for the valve are positioned in such recesses. The gate mechanism is formed of two members, commonly referred to as the gate and the segment. The inside surfaces of the gate mechanism are formed as double wedges and the gate mechanism expands in both the open and closed positions. The gate mechanism has a solid portion which contacts the seat members to seal the valve against flow in the closed position, and a ported section provided with a passageway which is aligned with the bore in the open position.

The seat members for a valve of this type are commonly pressed into the recesses. The seat member is slightly larger than the recess and the seal around the seat member is formed by the interference of the seat member with the circumferential wall of the recess. Such practice require maintaining extremely close tolerances in manufacture, not only dimensionally but it is also necessary that exact parallelinity between the gate, seat and recess be maintained. Normally, when the valve is closed, the pressure in the valve chamber will be lower than the pressure in the upstream side; thus, since the upstream seat member does not seal on the rear surface of the recess, it is possible for fluid to get behind the upstream seat and force it out against the gate mechanism causing an undesirable drag requiring a higher torque to operate the valve and resulting in wear to the upstream seat member. Further, it is difficult to obtain a tight seal if the gate, seat and recess are not in exact parallelism. Various means have been proposed to eliminate such floating action of the seat member. Most of them have required extra machining operations of either the recess or seat member and from an manufacturing standpoint such extra operations make the manufacture of the valve even more difficult. Moreover, none of the known proposed means assist in correcting for out-of-parallelism.

The present invention discloses a seat member which eliminates the necessity of holding rigid close tolerances, both dimensionally and as to parallelism. Also, it permits the seat member to float out a controlled amount and then allows pressure in the bore to enter the valve chamber, thereby eliminating a differential pressure between the bore and the valve chambers. Therefore, once the gate and segment have been contracted, the seat member will not drag against the face of the gate. Even if the seat member makes slight contact with the gate mechanism, there will be no drag since there is no differential pressure forcing the seat into contact with the gate mechanism. The present seat member is a loose fitting ring having a deformable plastic sealing ring inserted on the back face which contacts the rear wall of the recess and forms a seal around the seat member. By having such a deformable seal member on the back face, all of the unit load on the seat member focuses on such deformable seal and, therefore, provides a seal between the bore and the body that is virtually impossible to obtain by metal-to-metal contact. Even if the gate, seat and recess are not in exact parallel relation, a seal will be established since the deformable seal will take care of minor misalignment. Upon contraction of the gate mechanism, the force holding the compressible seal against the wall of the recess will be released and the upstream seat member will move toward the gate mechanism in an amount equal to the compression in the deformable seal member. The seal will then break contact with the intersecting wall of the recess and immediately release the pressure in the bore into the body which will equalize pressure on both sides of the seat member; therefore, the upstream seat will not float forward any further and, therefore, it will not seize the gate and drag thereon. Such construction will permit the valve to be operated with a lower torque and will increase the life of the seat.

The main object of the present invention is to provide a seat member for a gate valve which will have the seal around the seat member at the back of the recess and will upon contraction of the gate disengage from such rear wall to permit pressure to equalize in the bore and valve chamber.

It is another object to provide a seat member for a gate valve that will take care of minor misalignment between the faces of the gate mechanism, the seats and seat recesses.

It is a further object to provide a seat for a gate valve which is easy to machine and assemble.

It is a more specific object to provide a seat member for a parallel expanding through conduit gate valve which loosely fits in the valve recess surrounding the bore of such valve and is provided with a deformable seal member which contacts and forms a seal on the rear wall of the recess.

Other and further objects of the invention will be obvious upon an understanding of the illustrative embodiments about to be described, or will be indicated in the appended claim, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is a vertical section of a parallel expanding through conduit gate valve incorporating the present invention, the gate mechanism being shown fully expanded in the closed position.

FIG. 2 is a fragmentary view similar to FIG. 1 showing the gate mechanism starting to contract.

FIG. 3 is a view similar to FIG. 2 showing the gate mechanism fully contracted.

FIG. 4 is a vertical section of an alternative form of seat.

Referring to the drawings, FIG. 1 shows a parallel expanding through conduit gate valve of the type fully disclosed in M. P. Laurent's Reissue Patent 20,101, dated September 8, 1956. The valve has a housing 10 provided with a valve chamber 12 in which is housed the gate mechanism. A bore extends through the valve, it is divided into sections 14 and 15 by the intersecting valve chamber 12. The outer ends of the bore are provided with the necessary means to connect the valve to a flow system as is well known in the art. The inner ends of the bore open into the valve chamber 12. Surrounding the bore on opposite sides of the valve chamber 12 are annular recesses 16 and 17. Seat members 18 and 19 are positioned in the recesses 16 and 17 respectively. The construction and function of these seat members, which form the basis of the present application, will be explained subsequently. The upper portion of the housing 10 can be of any of the well known types of construction having a bonnet (not shown) through which extends a valve operating stem 20.

The ported gate mechanism is formed of two double tapered relatively displaceable sections, one herein termed the gate 22 and the other the segment 24. Both sections have ports 26 which in the open position of the valve are aligned with the bore to permit unobstructed passage of fluid through the valve. The upper ends of the gate and segment are solid and intersect the bore in the closed position to stop flow through the valve. The valve stem 20 is detachably secured to the upper end of the gate 22. Vertical movement of the stem 20 by means of a handwheel or operator (not shown) raises and lowers the gate mechanism as a unit.

The gate and segment, when assembled, are substantially rectangular in horizontal section so that their flat outer faces sealingly engage the corresponding flat faced valve seats 18—19. It is obvious, however, that the sealing faces of the gate mechanism and the corresponding faces of the valve seats may be arcuate or other suitable shape.

The inner opposed faces of the gate 22 and segment 24 diverge outwardly in the same directions from a central waist portion to provide two sets of wedging surfaces. Accordingly, with relative endwise displacement of the gate and segment from a centered position in either direction along the line of travel of the gate mechanism, there results a mutual wedging action between the inner contacting surfaces that is effective to expand the gate mechanism sufficiently to force the outer sealing faces thereof into tight sealing engagement with their respective valve seats, see FIG. 1. Relative movement is imparted to the gate mechanism by a lug or projection 28 on one end of the segment 24, which upon contact with a fixed abutment stops the movement thereof just before the gate 22 impelled by the valve stem 20 reaches its final limited travel. Hence, the gate and segment by relative endwise displacement are expanded into tight sealing engagement with their respective valve seats, in both open and closed positions of the valve.

In order to contract the gate mechanism so that it may move freely and easily between open and closed positions, the gate mechanism is provided with springs 30—30, one being shown. The action of the springs 30—30 is to yieldingly hold the gate and segment together with their annular wedging faces in contact and return the two members into this relation when the gate is relieved of expanding force during the travel of the gate mechanism from closed to open position and vice versa. Such contraction can be seen sequentially in FIGURES 1 through 3. Other means of contracting the gate such as those disclosed in M. P. Laurent's Patent No. 2,479,124, dated August 16, 1949, and M. P. Laurent's Patent No. 2,583,512, dated January 22, 1952, may be utilized in place of the springs 30—30.

Each seat member has an annular hub portion 32 which is of a smaller diameter than its respective recess. The hub portion 32 of seat member 18 loosely fits within its annular recess 16. The back wall of the hub portion 32 is provided with an annular groove 34 in which is positioned a deformable plastic ring 36. The ring 36 extends beyond the surface of the back wall of the hub portion 32. By having the deformable sealing member 36 on the back face of the seat, all of the unit load on the seat member caused by the expansion of the gate mechanism focuses on such deformable seal and, therefore, a tight seal is established between the bore and the interior of the valve. Such a seal is virtually impossible with metal-to-metal contact, especially in high pressure application (1000 p.s.i. and higher) unless there are lapped finishes, and the gate, seats and back wall of the recess are exactly parallel to each other.

Absolute parallelism is most difficult to obtain in normal manufacturing practice, and while with extreme care, an acceptable degree can be obtained; nevertheless, once the valve is installed in a line, installation stresses, line stresses and thermal stresses all tend to change the original manufacturing parellelinity. In order to correct for this out-of-parallelism, it is desirable to so design the deformable plastic sealing member 36 that upon full expansion of the gate mechanism the sealing member 36 will not be so completely compressed as to be totally confined within the annular groove 34 in which it is positioned. The height of the sealing member extending above the rear face of the seat upon full expansion of the gate mechanism will be in the nature of only several thousandths of an inch. In such case, since all of the unit load on the seat members focus on the sealing members, a seal will be formed by the sealing members even though the rear walls of the recesses, the seats and gate mechanism may not all be in exact parallelism.

Upon contraction of the gate mechanism, the upstream seat member 19 will move forward in an amount equal to the compression in the deformable sealing member 36, see FIG. 2. After it has moved forward for such a distance, the sealing member 36 will break contact with the rear wall of the recess 17 and will immediately release the pressure in the bore 15 into the valve chamber 12, see FIG. 3; therefore, pressure in the bore 15 and the valve chamber 12 will immediately equalize. Since the pressure on both sides of the seat member 17 is equalized, the seat member 17 will not float any further, see FIG. 3, and it will not seize the gate mechanism during its movement. Since the upstream seat 19 does not drag on the gate mechanism during its movement from one position to another, the torque necessary to operate the valve is substantially reduced. Also wear caused by such drag is materially reduced.

FIG. 4 shows an alternate form of construction for the seat member. In such construction the seat member 18' has the same hub portion 32 and deformable seal 36 on the rear face. To aid in sealing across the face of the seat, the front face of the seat member 18' is provided with a deformable seal member 40 such as that fully disclosed in J. S. Downs' and C. C. Pryor's copending patent application S.N. 630,791, filed December 27, 1956, now Patent 2,925,993. The seal member 40 has a greater inner diameter than the inner diameter of the seal member 36. Therefore, when the gate mechanism is contracted, the pressure in the bore will relieve across the face of the seat due to the differential area. Since the effective force acting on the front face of seat member 18' will be greater than the effective force acting on the rear face, the seat will be forced back into its recess and will remain there while the valve is being unwedged.

While the invention has been described as utilized in a parallel expanding through conduit gate valve, it is evident that it also can be advantageously used in a double wedge or expanding non through conduit valve.

As various changes may be made in the form construction and arrangements of the parts herein without departing from the spirit and scope of the invention and without sacrificing any of its advantages, it is to be understood that all matter herein is to be interpreted as illustrative and not in a limiting sense.

We claim:

A through conduit gate valve formed of a housing with a bore therethrough, a valve chamber intersecting said bore, parallel expanding gate mechanism located in said valve chamber, said gate mechanism provided with a passage alignable with the bore in the open position and a solid portion to cover said bore in the closed position, facing annular recesses surrounding the bore, each recess having an end wall intersecting the bore, an annular wall concentric with the bore, one side open to the bore and one end open to the valve chamber, a seat member in each of said recesses, each seat member being formed of an annular ring having a passage aligned with the bore, the outer diameter of each seat member being of a lesser diameter than the annular wall of its recess whereby each seat member loosely fits into its recess, the axial length of each seat member being greater than the axial length of its recess whereby a portion of each seat member protrudes into the valve chamber to form a sealing face, each sealing face of each seat member provided with an annular groove, a deformable plastic sealing member positioned in said annular groove, said deformable plastic sealing member extending beyond the plane of the sealing face to form an area of sealing contact in cooperation with a face of the gate mechanism, each seat member having an axially outward face which opposes the end wall of its recess, said axially outward face provided with an annular groove, the inner diameter of the annular groove in the axially outward face being of a lesser diameter than the inner diameter of the groove in the sealing face, a deformable plastic sealing member positioned in said annular groove, the deformable plastic sealing member extending beyond the plane of the axially outward face, said gate mechanism expanding in fully open and fully closed positions of the valve to force the seat members into their respective recesses and establish seals between the faces of the gate mechanism and the deformable plastic sealing members of the sealing faces of the seat members and seals between the deformable sealing members of the axially outward faces of the seat members and the end walls of the recesses, the gate mechanism contracting from such fully expanded position prior to moving from one position to another whereby, since the inner exposed area of the sealing face is greater than the inner exposed area of the axially outward face, the upstream seat member will be retained in its recess and will not result in a dragging contact with the upstream face of the gate mechanism.

References Cited in the file of this patent

UNITED STATES PATENTS

| | | |
|---|---|---|
| 1,969,375 | Laurent | Aug. 7, 1934 |
| 2,204,142 | MacClatchie | June 11, 1940 |
| 2,751,185 | Shand | June 19, 1956 |
| 2,776,813 | Blackman | Jan. 8, 1957 |
| 2,796,230 | Grove | June 18, 1957 |
| 2,874,718 | Kelly | Feb. 24, 1959 |

FOREIGN PATENTS

| | | |
|---|---|---|
| 896,583 | Germany | Nov. 12, 1953 |